(12) United States Patent
Ramseier (10) Patent No.: US 10,954,079 B2
(45) Date of Patent: Mar. 23, 2021

(54) DEVICE FOR LOADING TRANSPORT BAGS

(71) Applicant: Ferag AG, Hinwil (CH)

(72) Inventor: Marcel Ramseier, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/609,582

(22) PCT Filed: Apr. 25, 2018

(86) PCT No.: PCT/EP2018/060611
§ 371 (c)(1),
(2) Date: Oct. 30, 2019

(87) PCT Pub. No.: WO2018/202512
PCT Pub. Date: Nov. 8, 2018

(65) Prior Publication Data
US 2020/0062515 A1    Feb. 27, 2020

(30) Foreign Application Priority Data

May 5, 2017    (CH) ........................................ 0607/17
Dec. 15, 2017    (CH) ........................................ 1543/17

(51) Int. Cl.
*B65G 47/61*    (2006.01)
*B65G 9/00*    (2006.01)
(Continued)

(52) U.S. Cl.
CPC ............. *B65G 47/61* (2013.01); *B65G 9/004* (2013.01); *B65G 17/20* (2013.01); *B65G 19/025* (2013.01)

(58) Field of Classification Search
CPC ...... B65G 9/004; B65G 17/20; B65G 19/025; B65G 47/61
See application file for complete search history.

(56) References Cited

U.S. PATENT DOCUMENTS 748,576 A    1/1904    Bivert
1,994,782 A    3/1935    Olson
(Continued)

FOREIGN PATENT DOCUMENTS

DE    826270    12/1951
DE    36 05 317    2/1987
(Continued)

OTHER PUBLICATIONS

English translation of International Preliminary Report on Patentability dated Nov. 5, 2019 (Nov. 5, 2019), Application No. PCT/EP2018/060611, 11 pages.
(Continued)

*Primary Examiner* — Gene O Crawford
*Assistant Examiner* — Keith R Campbell
(74) *Attorney, Agent, or Firm* — Rankin, Hill & Clark LLP (57) ABSTRACT

An appliance for loading a suspended transport pocket from above with a transport item, in particular with a piece item, including a feed device for feeding the transport item into a transfer region of a suspended conveying device with a guide rail and with transport pockets that are movable along the guide rail. The course of the guide rail is designed such that the transport pocket is conveyed away upwards out of the transfer region in a suspended manner.

14 Claims, 7 Drawing Sheets

(51) Int. Cl.
   *B65G 17/20* (2006.01)
   *B65G 19/02* (2006.01)

(56) References Cited

U.S. PATENT DOCUMENTS

| | | | | |
|---|---|---|---|---|
| 3,338,179 | A * | 8/1967 | Klemm | B61B 10/025 |
| | | | | 104/172.4 |
| 4,972,934 | A | 11/1990 | Lassiter, Jr. et al. | |
| 8,490,774 | B2 * | 7/2013 | Janzen | B65G 9/002 |
| | | | | 198/397.01 |
| 8,607,963 | B2 * | 12/2013 | Wend | B65G 47/61 |
| | | | | 198/430 |
| 8,672,118 | B2 * | 3/2014 | Janzen | B65G 47/61 |
| | | | | 198/678.1 |
| 9,187,252 | B2 * | 11/2015 | Wend | B65G 9/002 |
| 9,499,345 | B2 * | 11/2016 | Fenile | B65G 47/61 |
| 10,005,616 | B2 * | 6/2018 | Fenile | B65G 9/004 |
| 2018/0312341 | A1 * | 11/2018 | Keller | B65G 47/61 |

FOREIGN PATENT DOCUMENTS

| | | |
|---|---|---|
| DE | 35 44 447 | 6/1987 |
| DE | 199 18 116 | 7/2000 |
| DE | 10 2004 018 569 | 11/2005 |
| DE | 10 2010 053 590 | 6/2012 |
| DE | 10 2012 018 925 | 3/2014 |
| DE | 10 2013 205 172 | 9/2014 |
| EP | 0 638 501 | 2/1995 |
| EP | 2 196 415 | 6/2010 |
| EP | 2 380 829 | 10/2011 |
| EP | 2 418 160 | 2/2012 |
| EP | 2 620 394 | 7/2013 |
| EP | 2 786 940 | 10/2014 |
| EP | 2 792 620 | 10/2014 |
| JP | 5-286551 | 11/1993 |
| WO | 2016/120032 | 8/2016 |

OTHER PUBLICATIONS

Switzerland Search Report dated Aug. 2, 2017, Application No. CH00607/17, 2 pages.

* cited by examiner

DEVICE FOR LOADING TRANSPORT BAGS

BACKGROUND OF THE INVENTION

Field of the Invention

The invention lies in the field of transport and conveying technology, in particular of intra-logistics.

Description of Related Art

According to a first aspect, the invention relates to an appliance for loading a suspended transport pocket from above with a transport item, in particular with a piece item. The appliance includes a feed device for feeding the transport item into a transfer region of a suspended conveying device. The suspended conveying device further includes a guide rail and transport pockets, which are movable along the guide rail.

The terms "at the top", "above" as well as "at the bottom", "below" relate to the gravitational direction.

The terms "to the top", "from above" and "to the bottom", "from below" in the context of a movement means that a movement component in the gravitational direction or counter to it is present.

Furthermore, the invention according to the first aspect also relates to a method for loading a transport pocket with a transport item by way of the appliance according to the invention, wherein the transport pocket is conveyed in the conveying direction into the transfer region in a suspended position, and the transport item is fed to the transfer region in the feed direction by way of a feed device and is transferred in a transfer direction from above through the receiving opening into the receiving compartment of the transport pocket.

In automated warehouses, vast production facilities and very generally concerning the transport of goods, very generally there exists the need to receive the transport items in suitable receptacles, to then convey these receptacles further, for example, via a suspended conveying device and to intermediately store them or to transport them to their designated location and to unload them again there.

In particular, suspended conveying devices are also used on sorting and order-picking articles. Order picking is putting together a selection of articles from an entirety (assortment of articles). For example, the order picking can be based on a customer order or a production order.

Hence, it is known from the state of the art to apply suspended conveying devices with transport pockets for the transport of articles or goods.

The published document DE 10 2004 018 569 A1, for example, describes a suspended conveyor with a plurality of collecting pockets that can be folded together and that are for receiving and for the sorting collecting of objects, in particular pieces of clothing. The collecting pocket includes a frame mount and a pocket pouch, which is suspended on the frame mount. The collecting pocket is suspended on the suspended conveying device via a hook, which is attached to the frame mount.

The advantage of transport pockets lies in the fact that they are designed in a flexible manner. The receiving compartment can be compressed or pressed together by way of this, e.g., by way of folding together. In this manner, the transport pockets permit goods logistics that are space-saving compared to, for example, rigid crates and containers. Empty transport pockets with a pressed-together receiving compartment can therefore be stored and conveyed in a space-saving manner. The receiving compartments do not need to be expanded to the extent that they take up space, until the goods are transported or stored.

Suspended conveying devices as other conveying devices require a corresponding amount of space. This, however, is only available to a limited extent. Thus, for example, space problems can occur in particular in a transfer region, in which a transport item is transferred in transport pockets to the suspended conveying device. This amongst other things is due to the fact that the suspended conveying device must share the available area with a feed device that conveys the transport item into the transfer region.

The published document DE 10 2008 061 685 A1 describes a facility with a loading station for transport pockets that are conveyed by way of a suspended conveying device. The loading station includes an upper feed rail for the transport pockets, a perpendicular conveyor, which is subsequent to the upper feed rail, for feeding the transport pockets into a lower loading position, a device for opening the transport pockets in the loading position and a lower lead-away rail, which is subsequent to the perpendicular conveyor, for leading away the transport pockets out of the loading position in a horizontal manner. Since the transport item is fed horizontally as well as conveyed away horizontally in the transport pockets, the facility requires a comparatively large amount of space.

SUMMARY OF THE INVENTION

It is then the object of the invention according to the first aspect to put forward an appliance for loading transport pockets with a transport item, the appliance taking up as little as possible area.

The appliance according to the invention is characterised in that the course of the guide rail is designed such that subsequently to the transfer of the transport item into the transport pocket, possibly subsequently to passing a pocket rest, which is arranged in the transfer region, the transport pocket is conveyed away upwards out of the transfer region in a suspended, in particular freely suspended manner.

Conveying-away out of the transfer region means a conveying procedure directly subsequent to the transfer region.

"Suspended" means that the transport pocket is aligned vertically in the rest position or has an inclination with respect to a vertical that is 45° or less, in particular 35° or less and very particularly 30° or less. The inclination can be forced by a deflection element, such as, e.g., a pocket rest.

"Freely suspended" in particular means that the transport pocket is aligned vertically in the rest position and in particular is not forcibly deflected into an inclination by a deflection element.

The movement of the transport pocket to the top directly subsequent to the transfer region in particular means that the vertical movement component is at least the same or larger than the horizontal movement components, should the latter be present at all.

The transfer region corresponds to that region of the appliance, in which the transport items are transferred, i.e., released or handed over, from the feed device onto the transport pockets of the suspended conveying device.

The manner in which the feed device and the suspended conveying device are designed and arranged relative to one another in particular is such that the transport pocket is moved into the transfer region in a suspended, in particular freely suspended manner.

The transport pocket in the open position in particular forms a receiving compartment for the transport item, the receiving compartment being accessible from above via a receiving opening.

The receiving compartment is accordingly in an open position during the transfer of the transport item, i.e., in the transfer region.

The appliance therefore includes, in particular, an opening mechanism, by way of which the transport pocket can be opened for the aforementioned purposes. The opening mechanism can be designed such that the transport pocket is already opened ahead of the transfer region in the conveying direction. The opening mechanism can also be designed such that the transport pocket is not opened until in the transfer region.

The opening mechanism can include a cam guide that acts upon a cam roller, which is arranged on the transport pocket, and thus effects the opening of the pocket. The cam guide can be stationary, wherein the cam roller is guided via the stationary cam guide during the conveying of the transport pocket into the transfer region.

The transport pocket can furthermore include opening means, via which the receiving compartment can be moved into the open position and or be kept in this, in particular counter to the gravitational force or counter to a restoring force. Such opening means can include the aforementioned cam roller. Furthermore, the opening means can also include sliding elements, pins, wire arches or wire eyelets.

In particular, the transport pocket includes a pocket rear wall that forms the rear side of the receiving compartment.

In particular, the pocket rear wall is designed in a self-supporting or intrinsically stable manner. In particular, the pocket rear wall is designed in a stiff manner. In particular, the pocket rear wall is designed in a plane or even manner.

According to a further development, the pocket rear wall forms a rear wall section that is extended beyond the receiving compartment in the open position of the transport pocket.

Furthermore, the transport pocket includes in particular a pocket front wall, which forms the front side of the receiving compartment. In particular, the pocket front wall is designed in a self-supporting or intrinsically stable manner. In particular, the pocket rear wall is designed in a stiff manner. In particular, the pocket front wall is designed in a plane or even manner.

The pocket front wall can be connected to the pocket rear wall via pocket side walls and a pocket base. In the open position, these form the receiving compartment.

The pocket front wall and the pocket rear wall in particular are movable relative to one another for opening and closing the transport pocket.

On opening, the transport pocket can be brought in particular from a closure position, in which the pocket front wall is arranged in a compact position towards the pocket rear wall, into an open position, in which the receiving compartment is expanded amid the formation of the receiving opening. The pocket front wall is spaced from pocket rear wall in the open position.

The pocket rear wall and/or the pocket front wall and in particular the complete transport pocket can include, for example, a frame. The frame can be spanned by a sheet formation, in particular a textile sheet formation such as a fabric, for forming the walls.

In particular, the frame is rigid. The frame can be of wire or of a rod assembly.

According to a further development of the invention, the transfer direction of the transport item into the transport pocket and the conveying direction or conveying path of the transport pocket out of the transfer region lie in a common plane.

According to a further development of the invention, the transfer direction of the transport item into the transport pocket and the conveying direction or conveying path of the transport pocket into the transfer region lie in a common plane.

A transfer direction is to be understood as that direction, in which the transport item is moved on transfer from the feed device into the transport pocket.

In particular, the transport pockets are connected to a conveying element, which is moved along the guide rail.

The guide rail runs towards the transfer region, in particular in an essentially horizontal and very particularly horizontal manner. Essentially horizontal also includes inclinations of the guide rail that deviate from the horizontal by 10° (angle degrees) or less, in particular 5° or less.

In particular, the guide rail forms a bending section in the transfer region. In the bending section, the transport pockets are deflected along a curved track from a feed direction into a conveying-away direction.

In the bending section, the transport pockets are deflected, in particular from a horizontal or essentially horizontal movement direction or feed direction into an upwardly directed, in particular obliquely upwardly directed movement direction or conveying-away direction.

According to an embodiment of the invention, the guide rail forms an in particular inclined conveying-away section directly subsequent to the bending section in the transfer region. In the conveying-away section, the guide rail in particular has an angle of 45° or more, very particularly of 60° or more with respect to a horizontal. The angle can further be 90° or less than 90°.

This means that the transport pockets are conveyed away upwards out of the transfer region at the mentioned angle.

The suspended conveying device is designed for the suspended, in particularly at least sectionwise freely suspended conveying of the transport pockets. The suspended conveying device in particular includes several transport pockets that are successively movable along a guide rail in the conveying direction.

In particular, the suspended conveying device is designed for the individual conveying of the transport pockets. The term "individual" means that the transport pockets or their conveying elements are not directly connected to one another, e.g., interlinked.

The suspended conveying device can include a singularisation mechanism upstream of the transfer region considered in the conveying direction, by way of which singularisation mechanism the transport pockets that are held back, e.g., in an accumulation space or along an accumulation stretch upstream of the singularisation mechanism, can be individually released or conveyed into the transfer region.

The singularisation mechanism can include a release element that releases the transport pocket. The release element can form a movable stop, on which the transport pockets are held back. The stop can be moved into a corresponding release position for the release of a transport pocket. The release element or its stop is controlled in particular via a control.

The singularisation mechanism can include a conveying screw, by way of which the individual transport pockets can be conveyed towards the transfer region.

The conveying screw is rotatably mounted about a rotation axis that is arranged parallel to the conveying direction.

A spirally or helically designed guide groove is arranged along the outer periphery of the conveying screw. The guide groove serves for receiving a catch element, such as a catch lug, which is arranged on the conveying element. This catch element engages into the guide groove and together with the conveying element and the transport pocket that is suspended on this is driven along the rotation axis of the conveying screw by way of the guide groove, which rotates with the conveying screw (worm).

An accumulation stretch, in which the accumulating transport pockets are held back can be formed upstream of the singularisation device considered in the transport direction.

The suspended conveying device can further include a pusher conveyor (driver conveyor) with at least one and in particular several drivers for driving the conveying element and herewith the transport pocket that is connected to this, in the conveying direction. The at least one driver can be arranged on an in particular circulating driver element such as a driver chain. Hence several drivers can be arranged successively and spaced from one another along the driver element. The at least one driver can be a driver dog.

In particular, the pusher conveyor is arranged downstream of the singularisation mechanism and in particular downstream of the conveying screw in the conveying direction. The singularisation mechanism or the conveying screw transfers the transport pockets in particular onto the pusher conveyor.

The conveying element can include a contact element for forming a catch contact with the driver of the pusher conveyor.

The pusher conveyor is actively driven by a drive.

In particular, the pusher conveyor serves for the active conveying of the transport pockets upwards along the guide rail counter to gravitational force subsequent to the transfer region. The pusher conveyor therefore in particular corresponds to an upwards conveyor.

The pusher conveyor can also serve for the active conveying of the transport pockets along the guide rail into the transfer region. The conveying by the pusher conveyor in particular is effected downstream of the singularisation device, in particular downstream of the conveying screw considered in the conveying direction.

The pusher conveyor can also serve for the active conveying of the transport pockets along the guide rail in the transfer region.

In particular, the feed device forms a conveying surface, on which the transport item lies. The conveying surface can be continuous or interrupted.

The feed device or the conveying surface in particular runs horizontally or essentially horizontally. Essentially horizontally means that the feed direction deviates from a horizontal by 10° or less, in particular 5° or less.

In particular, the feed device includes at least one conveying unit that forms a conveying surface. In particular, the conveying surface is formed by a circulating conveying element. The conveying element can be driven.

The conveying element can be extensive. The conveying element can be a conveying belt, a mat chain or a roller track.

In particular, the feed device is designed to feed the transport item to the transfer region in a singularised or portioned manner. Hereby, the transport item is transferred from the feed device into the individual transfer pockets in each case in a singularised or portioned manner. For this, the transport item can be fed to the transfer region in a singularised or portioned manner in compartments or partitions of the feed device.

The transport item can be a (portioned) bulk product such as powder, granulate, small parts (e.g., screws) etc. The transport item, however, in particular includes piece items, i.e., individual, discrete objects. These objects can be household articles, sport articles, clothes, shoes, packaged articles, filled bags (postal bags) or packages such as cardboard boxes or boxes. Accordingly, the transport pockets can be loaded with individual piece items.

The transfer region can be arranged at the head end of a deflecting location of a conveying element of the feed device. In particular, the conveying element is deflected downwards at the deflecting location.

According to a further development of the invention, the feed device includes several conveying units that are arranged successively in the feed direction and that each form a conveying surface. The conveying units each include in particular a circulating conveying element. The conveying elements can be driven individually.

According to a further development of the invention, the conveying path of the transport item, which is fed by the feed device, can intersect with the conveying path of the transport item that is conveyed away in the transport pockets.

In such a case, the feed device can include a conveying section, which can be moved away out of a feed position for releasing the conveying path of the transport pocket to be conveyed away out of the transfer region. The feed position corresponds to the position that the mentioned conveying section assumes during the transfer of a transfer item into the transport pocket.

In particular, the mentioned conveying section can be pivotable away out of the transfer position. The mentioned conveying section can be formed by a conveying unit.

In particular, the feed device includes a conveying unit that terminates towards the transfer region and which is movable, in particular pivotable away out of a transfer position for the release of the conveying path of the transport pocket to be conveyed away out of the transfer region.

The terminating conveying unit can include a circulating conveying element as already described above. The terminating conveying unit can also include a roller track, via which the transport item is transferred into the transport pockets.

In the transfer region, the transport pocket is arranged with its receiving compartment running ahead in particularly frontally in front of the feed device, when considered in the conveying direction of the transport pocket.

The appliance or the feed device can form a pocket rest, on which the transport pocket bears or lies in particular with the pocket front wall in the transfer region. In particular, the transport pocket bears or lies on the pocket rest in an extensive manner.

The rest surface of the pocket rest can form an angle of 45° or more, in particular 60° or more with a horizontal. Furthermore, the angle in particular is smaller than 90°.

By way of this, the transport pocket can be stabilised in the transfer region with regard to the transfer of the transport item. Any occurring swinging of the transport pocket is stopped in the transfer region by way of this.

Furthermore, the rest surface can already assume the inclination of the loaded transport pocket, which this transport pocket assumes in any case in the freely suspended position on account of the centre of gravity lying in front of the suspension point. A swinging of the transport pockets subsequent to the transfer region can be prevented or at least reduced by way of this.

The pocket rest can also be designed such that the transport pocket rolls upwards or slides upwards on the pocket rest on conveying away out of the transfer region subsequent to the transfer of the transport item.

In particular, the pocket rest accordingly forms a rest surface. The rest surface can connect directly onto the conveying surface of the feed device.

The pocket rest can also correspond to an end section of a conveying surface of the feed device or be part of the terminating conveying unit.

The pocket rest can form a roller track. This has the advantage that the transport pocket, which is moved out of the transfer region T, can roll on the roller track with its pocket front wall in particular counter to the transfer direction.

If the pocket rest is formed from an end section of a conveying surface or of a terminating conveying unit, then the roller track can also be designed such that the transport item, which is to be transferred into the transport pocket, rolls over the roller track in the transfer direction.

The pocket rest can have an inclination with respect to a vertical. The pocket rest can also be aligned vertically.

The invention further also relates to a method for loading a transport pocket with a transport item. In particular, the method is operated by way of an appliance, which is described above.

According to the method, the transport pocket is moved into the transfer region or enters into this in the conveying direction in a suspended, in particular freely suspended manner.

The transport pocket is conveyed along the guide rail into the transfer region via the conveying element.

In particular, the transport pocket is conveyed into the transfer region in an essentially horizontal or horizontal manner. Essentially horizontal manner also includes inclinations that deviate from the horizontal by 10° or less, in particular 5° or less.

The transport pocket can also be conveyed into the transfer region along a descent. In particular, the descent permits a gravity-assisted conveying. In this case, the transport pocket can even be conveyed into the transfer region in an autonomous manner, i.e., without an active drive.

However, it is also possible for the transport pocket to be actively conveyed into the transfer region by way of a pusher conveyor.

In particular, the transport pockets are conveyed into the transfer region in an individual manner. For this, the transport pockets can be individually released towards the transfer region in the conveying direction via the singularisation mechanism.

The transport pocket is moved into and through the transfer region with the receiving opening running ahead in the conveying direction with respect to the pocket rear wall.

This means that the transport pocket is moved into the transfer region and out of the transfer region with the receiving opening running ahead in the conveying direction with respect to the pocket rear wall.

The transport pocket is opened upstream of the transfer region or in the transfer region. The opening of the transport pocket is effected actively via the mentioned opening mechanism.

According to a further development of the method, the conveying movement of the transport pocket is stopped in the transfer region. This means that the transport pocket is stopped for the purpose of the transport of the transport item from the feed device into the receiving compartment of the transport pocket. In particular, this is effected by way of stopping the pushing conveyor.

The transport pocket can be stopped upstream of a bending section in the transfer region. The transport pocket can be stopped in a bending section in the transfer region. The transport pocket can be stopped after a bending section in the transfer region.

Accordingly, the transport pocket is in a defined transfer position along the conveying stretch of the suspended conveying device for the purpose of the transfer of the transport item in the transfer region.

By way of the feed device, the transport item is conveyed in the conveying direction to the transfer region and is transferred in a transfer direction from above through the receiving opening into the receiving compartment of the transport pocket. Accordingly, the pocket opening is located below the conveying surface of the feed device.

In particular, the transfer direction has a direction component in the gravitational direction. Accordingly, in the transfer region the transport item is transferred in the transfer direction from the feed device into the transport pocket in a gravitationally assisted manner.

The transfer of the transport item can be effected by way of a guided movement, for example via an inclined conveying surface. The transfer of the transport item can also be effected by way of a non-guided movement, such as, e.g., a free fall.

The transport pocket is conveyed away upwards in a suspended manner subsequent to the transfer of the transport item into the transport pocket.

In particular, the transport pocket is conveyed away out of the transfer region along a guide rail via the conveying element.

According to a further development of the invention, the transport pocket directly subsequently to the transfer region is moved out of the transfer region over a conveying stretch section essentially counter, in particular counter to the transfer direction of the transport item into the transport pocket.

Essentially counter to the transfer direction means that the two directions can enclose an angle of 15° or less, in particular of 5° or less.

If the conveying path of the transport pocket, which is conveyed away out of the transfer region, intersects the conveying path of the transport item of the feed device, then for the release of the conveying path of the transport pocket, which is to be conveyed away out of the transfer region, the respective conveying section of the feed device is moved away, in particular pivoted away out of its conveying position into a release position.

The appliance according to the invention has the advantage that the transport pockets are conveyed away upwards and therefore out of the conveying level of the feed device directly subsequent to the transfer of the transport item. In this manner, the conveying paths of the suspended conveying device and of the feed device run on different levels in a space-saving manner. The appliance according to the invention requires less installation area on account of this.

Furthermore, space for a subsequent transport pocket is immediately released due to the upwards conveying-away of the filled transport pocket. The filling procedure can be accelerated by way of this.

A further invention aspect relates to a suspended conveying device, including a guide rail and at least one transport pocket for the suspended transport of a transport item, in particular of a piece item, along a conveying path, wherein the at least one transport pocket is connected to a conveying element which is movable along the guide rail, via a connection structure.

As a rule, transport pockets include suspension hooks, via which these are fastened, e.g., to a roller-guided conveying element. This, for example, also relates to the two initially cited publication documents.

The transport pocket is freely swinging with respect to the conveying element by way of the suspension of the transport pockets via a suspension hook. This means that the transport pocket can swing in or counter to the conveying direction as well as transversely to the conveying direction.

As a rule, inertia forces cause the transport pockets to swing. Inertia forces occur, for example, on accelerating or braking the transport pocket along the transport stretch. The transport pocket can also be caused to swing given direction changes.

A freely swinging suspension of the transport pocket indeed has its advantages. Thus the aforementioned forces are converted into kinetic movement energy on swinging. In contrast, given a rigid suspension of the pockets, forces would act upon the connection between the transport pocket and the conveying element, as well as also upon the rail-guided conveying element. The consequence of this would be greater friction forces between the conveying element and the guide rail and correspondingly greater wear, as well as a high loading of the connection between the transport pocket and the conveying member.

The object of the present invention according to the second invention aspect is therefore to suggest a suspended conveying device, concerning which the disadvantages of a freely swinging transport pocket no longer occur or are at least limited. Despite this, the transport pocket should not be rigidly suspended on the conveying element and should have the aforementioned advantages of a freely swinging transport pocket.

The invention according to the second aspect is then characterised in that the connection structure includes a pivoting body and a connection body, wherein the transport pocket is fastened to the pivoting body. In contrast, the connection body is connected to the conveying element.

The pivoting body is connected to the connection body via a pivoting connection in a manner such that the pivoting body is pivotable in a guided manner transversely to the conveying direction with respect to the connection body. Accordingly, the transport pocket, which is fastened to the pivoting body, is pivotable transversely to the conveying direction via the pivoting body.

According to a further development of the invention, the connection body includes pivoting stops for limiting the pivoting angle of the pivoting body.

The pivoting body for its part can form pivoting limitation surfaces. The pivoting limitation surfaces are brought to abut on the pivoting stops for limiting the pivoting angle of the pivoting body on reaching the maximal pivoting angle. This means that the pivoting angle is limited by the abutting of the pivoting limitation surfaces on the pivoting stops.

The maximal pivoting angle can be 60° or less, in particular 45° or less, and very particularly 25° or less. The pivoting angle herein corresponds to the angle of the pivoting movement between a pivoting stop which is at the left and right considered in the conveying direction.

The pivot stops can include damping elements, e.g., of rubber-elastic plastic, spring elements or gel, which damp the abutting of the pivoting bodies on the pivoting stops and absorb kinetic energy.

The pivoting limitation surfaces can include damping elements, e.g., of rubber-elastic plastic, spring elements or gel, which damp the abutting of the pivoting bodies on the pivoting stops and absorb kinetic energy.

The connection body can be of one or more parts. The connection body can consist of metal, such as, e.g., steel.

According to a further development of the invention, the connection body can form a pivoting guide for a guided pivoting movement of the pivoting body transverse to the conveying direction. The pivoting guide in particular is to prevent a pivoting of the pivoting body in or counter to the conveying direction.

In particular, the pivoting guide includes a first guide element, which considered in the conveying direction is arranged upstream of the pivoting body as well as a second guide element, which is arranged downstream of the pivoting body. In particular, the guide elements are guide walls.

The pivoting body is arranged between the first and the second guide element at least via a pivoting body section.

According to a further development of the invention, the connection structure is designed in a manner such that this prevents a rotation of the transport pocket about its middle longitudinal axis. Amongst other things, this can be effected by way of the aforementioned pivoting guide.

In particular, the pivoting body is connected to the connection body via a physical pivot. In particular, the connection is releasable and can be a screw connection for example.

The pivot forms a pivoting mounting for the pivoting body on the connection body.

In particular, the pivot is aligned parallel to the conveying direction.

In particular, the pivot is led through the aforementioned first and second guide element as well as through the pivoting body section, which is arranged between the two guide elements.

According to a particular embodiment, the connection body is designed in a U-shaped manner. The U-shaped connection body includes two lateral walls as well as a connection wall, which connects the two lateral walls to one another.

The pivoting body is pivotably mounted at least with a pivoting body section, between the lateral walls transversely to the conveying direction.

In particular, the two lateral walls are part of the aforementioned pivoting guide and correspond to the mentioned guide elements or guide walls.

The pivoting body is guided with at least a pivoting body section into a pivoting space of the U-shaped connection body, which is formed by the two lateral walls and the connection wall.

The pivot is led through the lateral walls of the U-shaped connection body as well as through the pivoting body section, which is arranged between the two lateral walls.

In particular, the connection body is connected to the conveying element via the connection wall. The connection can be releasable and include, for example, a screw connection.

The pivoting body can be designed in a single-part or multi-part manner. In particular, the pivoting body consists of plastic or metal. The pivoting body can be an injection moulded part.

In particular, the pivoting body forms a bow receiver for a holding bow or for a holding bow section of a holding bow of the transport pocket.

The length of the bow receiver, which extends transversely to the conveying direction in the operational position, in particular is a multiple of the largest diameter of the bow receiver, which is measured parallel to the conveying direction. In particular, the length of the bow receiver can be at least fivefold the mentioned diameter of the bow receiver.

In particular, the transport pocket is pivotably mounted in the bow receiver in or counter to the conveying direction via the holding bow or the holding bow section. In particular, the holding bow is of wire.

The holding bow can be mounted rigidly transversely to the conveying direction, which is to say in a manner in which it is not pivotably mounted in the bow receiver.

The holding bow or the holding bow section, which is held in the bow receiver, in particular in cross section is designed in a round, such as oval or circularly round manner.

According to an embodiment variant, the pivoting body can therefore form a slot-like bow receiver, which is open to the connection body, for mounting the holding bow. For this, in particular the pivoting body can be designed in a U-shaped manner.

The holding bow can be secured against a displacement in the direction of the conveying element via securing elements, such as roll pins of spring steel, which are led transversely through the slot-like bow receiver.

According to an embodiment variant, the pivoting body can include two, in particular constructionally identical joining elements that are connected to one another into the pivoting body amid the formation of a bow receiver for the holding bow.

The bow receiver can be designed in a manner such that the pivoting body encompasses the holding bow over the complete periphery at least in sections. This means that the pivoting body is designed at least in sections as a through-opening.

According to a particular embodiment variant of the bow receiver, the pivoting body encompasses the holding bow over the whole periphery over the complete length of the bow receiver. This means that the bow receiver is formed as a through-opening over its entire length.

In particular, the pivoting body or the bow receiver can essentially positively encompass the holding bow at least in sections or over the entire length.

The holding bow can be held in the bow receiver merely with a slight radial play. This permits an uninhibited pivoting movement of the pocket in and counter to the conveying direction.

Furthermore, the holding bow can be held in the bow receiver only with a slight lateral play. This permits only a slight lateral displacement of the holding bow relative to the pivoting body.

One can envisage the bow receiver not holding the holding bow in a rigid manner.

According to an embodiment variant of the bow receiver, the bow receiver can include a V-shaped receiving section or be designed as a V-shaped bow receiver. The inclined side flanks of the V-shaped bow section or of the V-shaped bow receiver converge downwards, i.e. in the gravitational direction, in the operational position.

Above the V-shaped receiving section, the bow receiver can form a further, e.g., rectangular receiving section that, together with the V-shaped receiving section forms the bow receiver.

The bow receiver according to this embodiment variant in particular has a cross-sectional area that corresponds to a multiple of the cross-sectional area of the bow to be received.

The V-shaped receiving section, or the V-shaped receiver permits an evasive movement of the holding bow out of a defined conveying position in the region of the coinciding inclined flanks given a particular external force action, such as, for example, in the form of centripetal forces given the travel along curves. The V-shaped receiving section or the V-shaped receiver therefore permits an evasion of the holding bow out of its defined conveying position along its inclined, lateral flanks.

As soon as a particular external force action dies down again, the V-shaped design of the bow receiver or of a section thereof permits the holding bow to return again into its defined conveying position.

The V-shaped receiving section or the V-shaped receiver therefore also ensures that in the absence of a particular external force action, the holding bow assumes a defined conveying position due to gravity. The defined conveying position in the operational position in particular corresponds to the lowest point of the V-shaped receiving section or of the V-shaped receiver.

In this manner, local force peaks, which originate from the holding bow and which would act directly upon the pivoting body given a rigid mounting of the holding bow, are avoided or reduced.

The limited cross-sectional area of the bow receiver however places limits on the evasive movement of the holding bow, so that the pocket cannot deflect to an infinite extent and compromise the conveying operation on account of this.

The suspended conveying device with the connection structure according to the second invention aspect in particular can be used in an appliance according to the first invention aspect.

The suspension of the transport pocket on the conveying element in accordance with the invention has the advantage that the transport pocket can freely swing in a defined pivoting angle transversely to the conveying direction via the pivoting body. Tilt forces that act upon the conveying element can be avoided or reduced by way of this. Indeed these forces lead to an increased wear on the conveying element, in particular on the runner wheels or sliding elements of the conveying element and possibly also on the guide rail.

However, the pivoting angle of the transport pocket according to the invention is limited, so that the transport pocket cannot laterally pivot out to an unlimited extent and possibly collide with facility parts or other transport pockets. This is of particular significance in storage spaces of the suspended conveying device for the (intermediate) storage of the empty or filled transport pockets, in which the spatial conditions as a rule are restrictive and a lateral pivoting of the transport pockets is only possible to a limited extent.

The conveying element of the suspended conveying device according the two aforedescribed invention aspects in particular is a runner vehicle with rollers, via which the runner vehicle is rollingly guided along at least one guide rail, which is designed as a runner rail.

The runner vehicles can be designed as outer runners or inner runners.

In particular, the runner vehicles can be designed as individual vehicles.

Individual vehicles means that the runner vehicles are not directly connected to one another, i.e., interlinked one another. This permits an individual conveying of the transport pockets.

BRIEF DESCRIPTION OF THE DRAWINGS

The two invention aspects are hereinafter explained in more details by way of embodiment examples, which are represented in the accompanying figures. In each case in a schematic manner are shown in.

DETAILED DESCRIPTION OF THE INVENTION

Basically in the figures, the same parts are provided with the same reference numerals. Certain features are not represented in the figures for the better understanding of the invention.

The described embodiment examples are given as examples of the subject-matter of the invention and have no limiting effect. Thus in particular the transport pockets which are shown in the present figures are merely exemplary. Other embodiments of the transport pockets are likewise conceivable.

Figure 1:
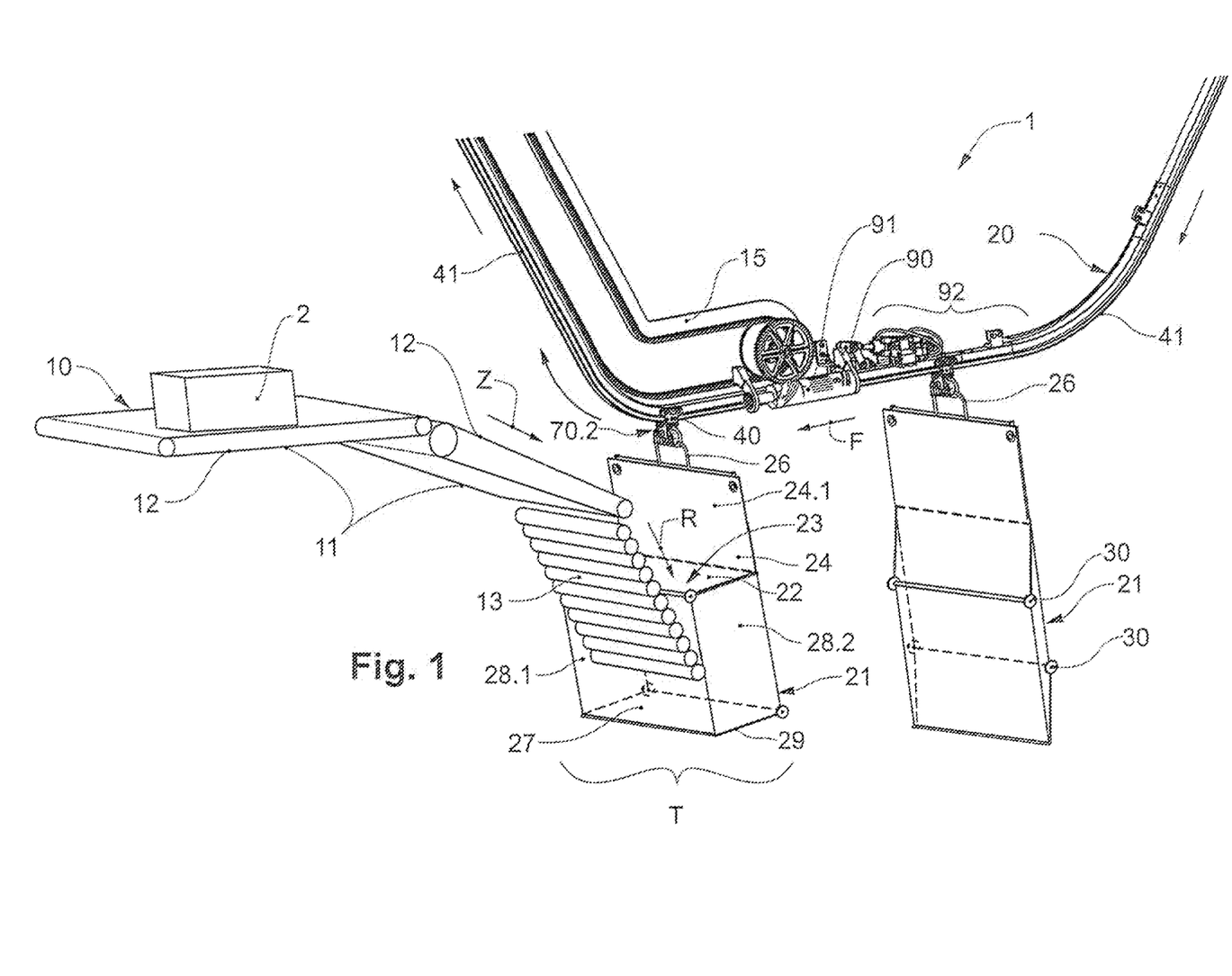
FIG. 1: a perspective view of an appliance according to the invention in the transfer region, according to the first invention aspect.

The appliance 1 according to the invention and according to FIG. 1 includes a suspended conveying device 20 as well as a feed device 10 that together form a transfer region T.

The suspended conveying device 20 includes a plurality of transport pockets 21, which each include a holding bow 26. The transport pockets 21 are each connected to a runner vehicle 40 by way of the holding bow 26 via a connection structure 70.2 according to the second embodiment variant. Of course, a connection structure 70.1 according to the first embodiment variant is possible.

The runner vehicle 40 includes runner rollers 45, via which this rolls along a guide rail 41 of the suspended conveying device 20 for the purpose of conveying the transport pocket 21.

The suspended conveying device 20 includes a singularisation mechanism 90 with a conveying screw 91 upstream of the transfer region T in the conveying direction F. A pusher conveyor or upwards conveyor 15 connects to the conveying screw 91. The transport pockets 21 are moved into the transfer region T in an individual manner by way of the pusher conveyor 15.

The pusher conveyor 15 is designed as a rotary dog apparatus, which is operated in a cycled manner. The rotary dog apparatus is characterised by a dog chain, on which a plurality of driver dogs are arranged successively and spaced from one another.

An accumulation stretch 92, in which the transport pockets 21, which are conveyed towards the singularisation mechanism 90, are held back until their conveying into the transfer region T is formed upstream of the singularisation mechanism 90. The functioning manner of the singularisation mechanism 90 and of the conveying screw 91 has already been explained in the general description part.

The guide rail 41 and accordingly the conveying path of the transport pockets 21 run horizontally towards the transfer region T. The guide rail 41 forms a bending section in the transfer region, in which bending section the transport pockets 21 are deflected in a curved path from a horizontal movement direction into an obliquely upwardly directed movement direction.

The feed device 10 includes several conveying units 11, which are arranged successively in the feed direction Z, each with a conveying belt 12. The conveying units 11 form a conveying surface for the transport item 2, which is to be conveyed into the transfer region T.

The feed device 10 in the transfer region T includes a terminating conveying unit 13 in the form of a roller track, over which the transport item 2 can roll and slide or slip from above into the transport pocket 21.

The transport pocket 21 includes a pocket rear wall 24, which is trailing in the conveying direction F, and a leading pocket front wall 27 and these are connected to one another via pocket side walls 28.1, 28.2 as well as via a pocket base 29.

Figure 2A:
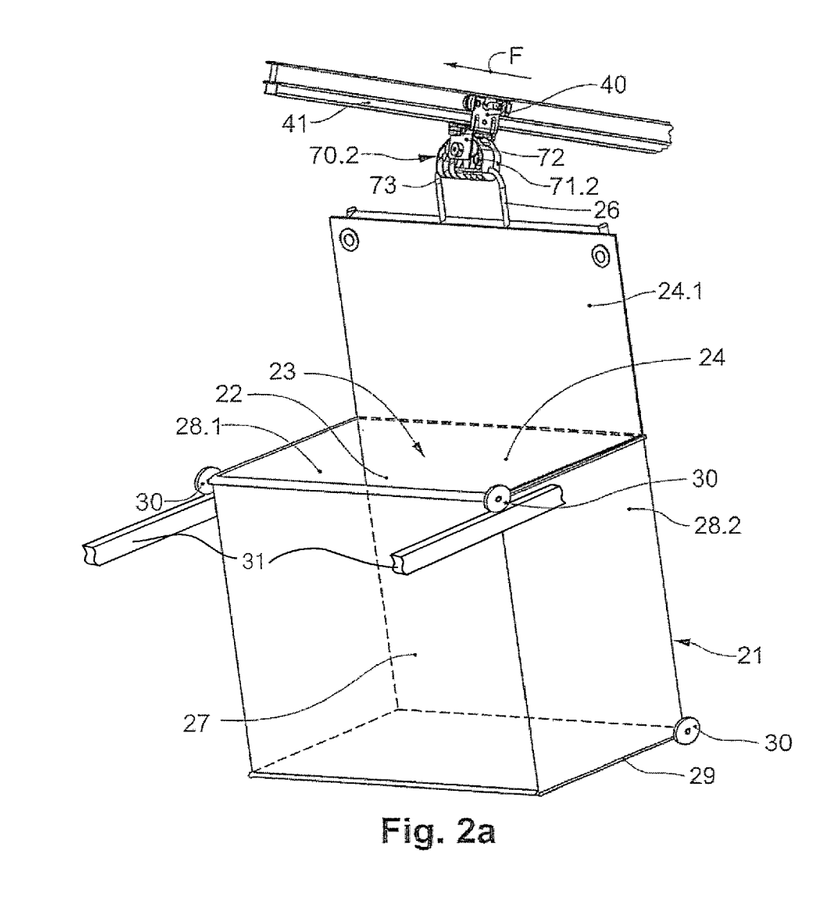
FIG. 2*a*: a perspective view of an opened transport pocket.
Figure 2B:
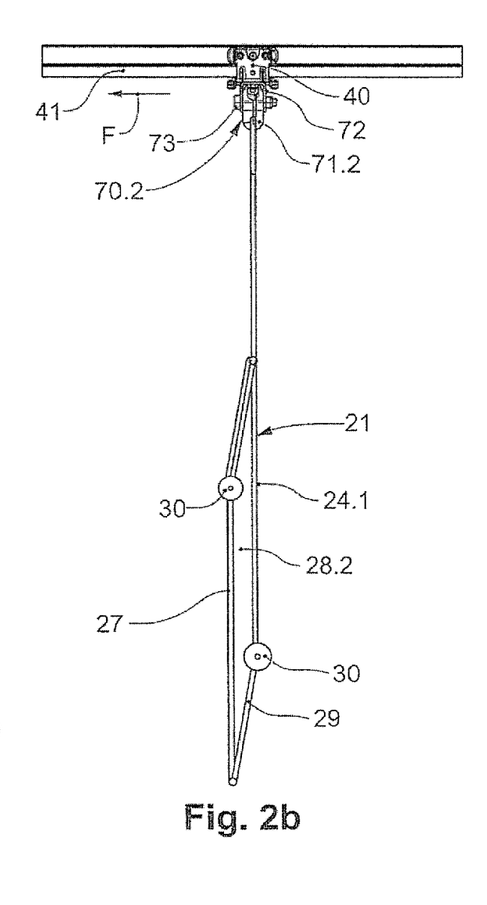
FIG. 2*b*: a lateral view of the closed transport pocket according to FIG. 2*a*.

In the open position, the pocket rear wall 24 and the pocket front wall 27 together with the pocket side walls 28.1, 28.1 and the pocket base 29 form a receiving compartment 23 that is open to the top with a corresponding receiving opening 22 (see also FIGS. 2*a* and 2*b*).

The transport pocket 21 further towards the runner vehicle 40 forms an extended rear wall section 24.1, on which the holding bow 26 is arranged.

The pocket rear wall 24 as well as the pocket front wall 27 is designed in an intrinsically stable, i.e., self-supporting manner.

The transport pocket 21 includes a frame of wire, which is spanned with a fabric for forming the walls 24, 27, 28.1, 28.2.

The transport pocket 21 according to the present embodiment can be folded open from a closure position (FIG. 2*b*), in which the pocket front wall 27 is set back towards the pocket rear wall 24, into an open position (FIG. 2*a*), in which the receiving compartment 23 is formed, and vice versa.

The transport pocket 21 further comprises cam rollers 30 which on interacting with an opening mechanisms 31 such as a cam guide, serve for the opening of the transport pocket 21.

The transport pocket 21 is connected to a runner vehicle 40 via the holding bow 26. For this, the holding bow 26 is fastened with a bow section to a connection structure 70.2 that, in turn, is connected to the runner vehicle 40.

The connection structure 70.2 and 70.1 is described in more detail in the context of FIGS. 3 to 7 within the framework of the second invention aspect.

On carrying out the method according to the invention, an individual transport pocket 21 is moved in the conveying direction F along a feeding conveying stretch into the transfer region T with the receiving compartment 23 running ahead in the conveying direction F.

The transport pocket 21 is actively opened by way of an opening mechanism 31 upstream of or in the transfer region T.

In the transfer region T, the transport pocket 21 bears with its pocket front wall 27 on the terminating conveying unit 13 of the feed device 10, which consequently forms a pocket rest.

As soon as the transport pocket 21 has reached the transfer region T, the conveying of the transport pocket 21 is stopped for the purpose of the transfer of a transport item 2. As a result of this, the transport pocket is not involved in a conveying movement on transfer of the transport item 2 into the transport pocket 21.

A transport item 2, which lies on the conveying surface of the conveying units 11, is fed to the transfer region T via the feed device 10. The transport item 2 slides over the roller track of the terminating conveying unit 13 in a transfer direction R through the receiving opening 22 into the receiving compartment 23.

After the transfer of the transport item 2 into the transport pocket 21, the transport pocket 21 with the transport item 2 is moved by way of the pusher conveyor 15 along the bending section of the conveying rail along a curved track out of the horizontal conveying obliquely upwards out of the transfer region T. With this procedure, the transport pocket 21 rolls with its pocket front wall 21 on the roller track of the terminating conveying unit 13.

The terminating conveying unit 13 with the roller track can be pivoted away out of its conveying position for releasing the conveying path for the transport pocket 21, which is loaded with the transport item 2.

As soon as the transport pocket 21, which is loaded with the transport item 2, is conveyed away upwards out of the transfer region T, a subsequent transport pocket 21 can be conveyed into the transfer region T.

This is the case when the transport pocket 21, which is loaded with the transport item 2, is moved out of the transfer region T at least by one a pocket length.

Figure 3:
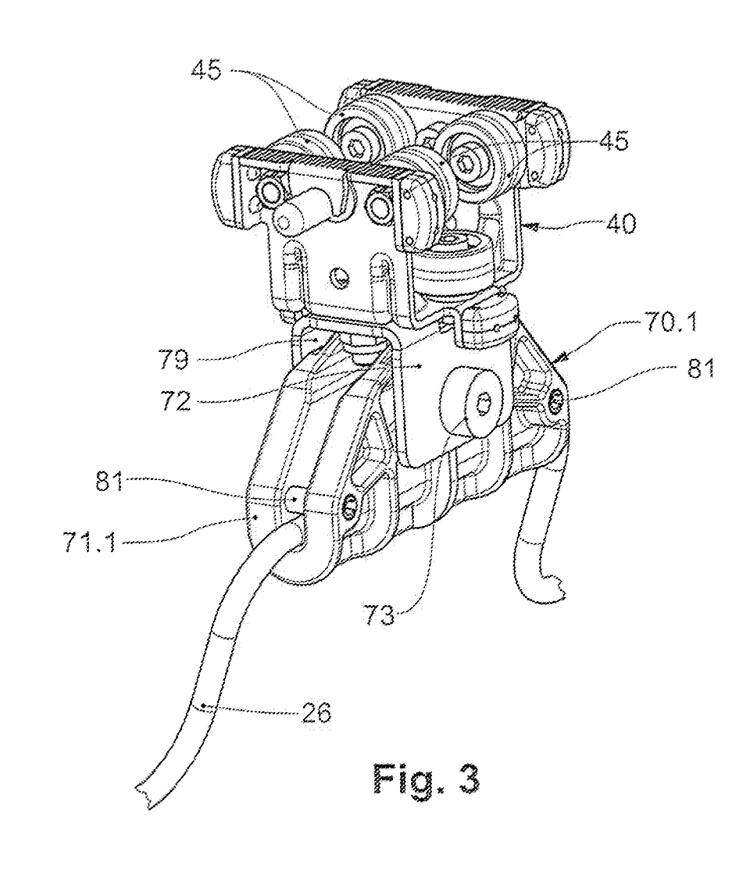
FIG. 3: a perspective view of a first embodiment variant of a connection structure according to the invention and with runner vehicles, according to the second invention aspect.
Figure 5A:
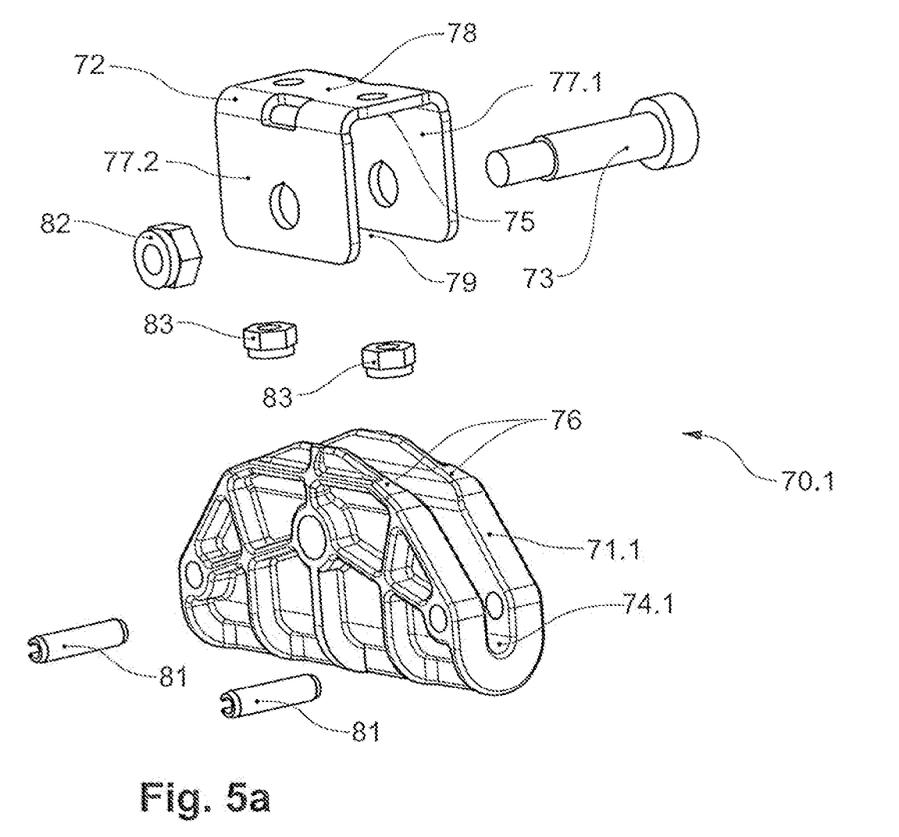
FIG. 5*a*: an exploded view of the connection structure according to the first embodiment variant according to FIG. 3.
Figure 5B:
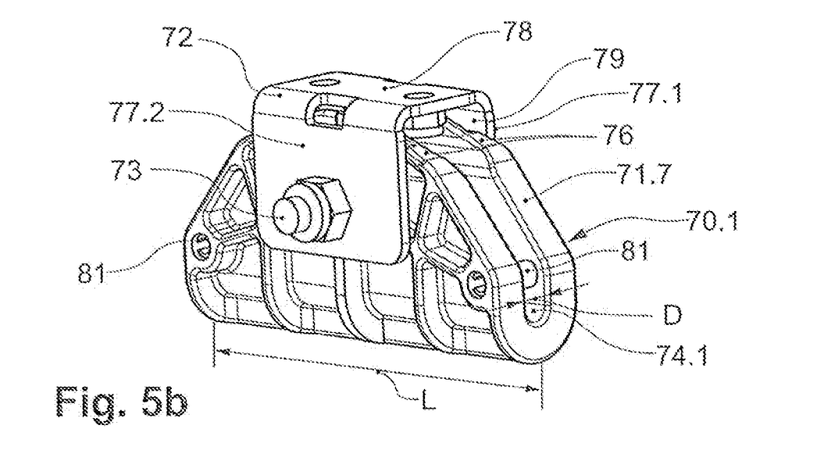
FIG. 5*b*: a perspective view of the connection structure according to the first embodiment variant according to FIG. 3.
Figure 6A:
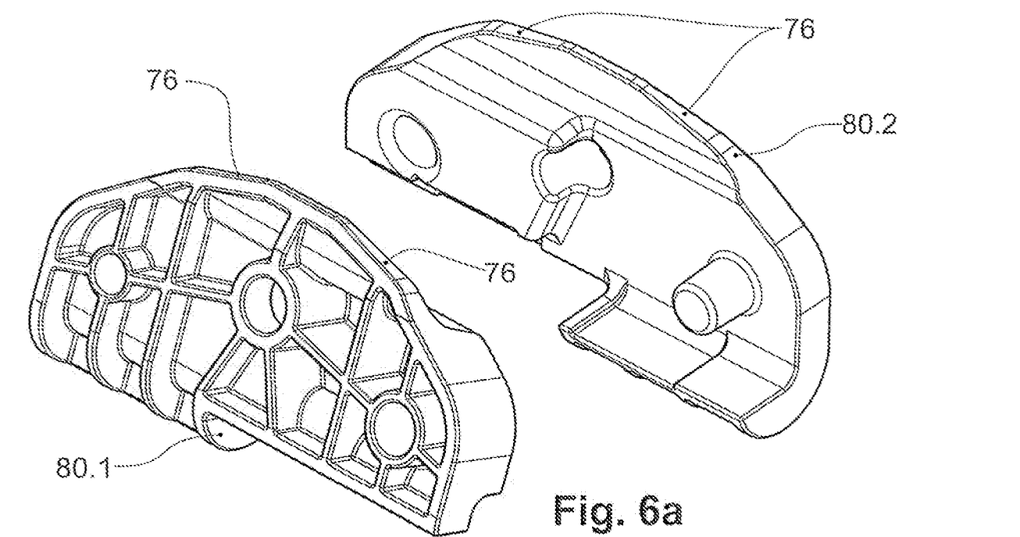
FIG. 6*a*: an exploded view of the connection structure according to the second embodiment variant according to FIG. 4.
Figure 6B:
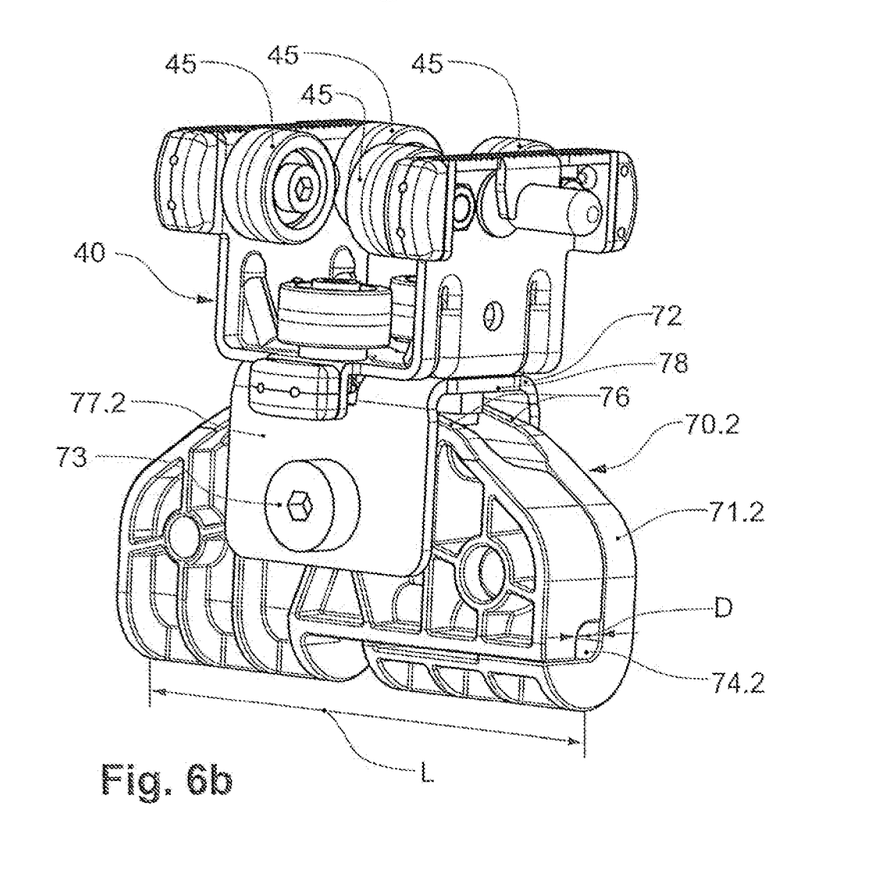
FIG. 6*b*: a perspective view of the second embodiment variant of the connection structure according to the invention and with runner vehicles, according to FIG. 4.

FIG. 3 as well as FIGS. 5a and 5b each show a first embodiment variant of a connection structure 70.1 according to the second invention aspect.

FIGS. 4, 6a, 6b and 8 each show a second embodiment variant of a connection structure 70.2 according to the second invention aspect.

Figure 9:
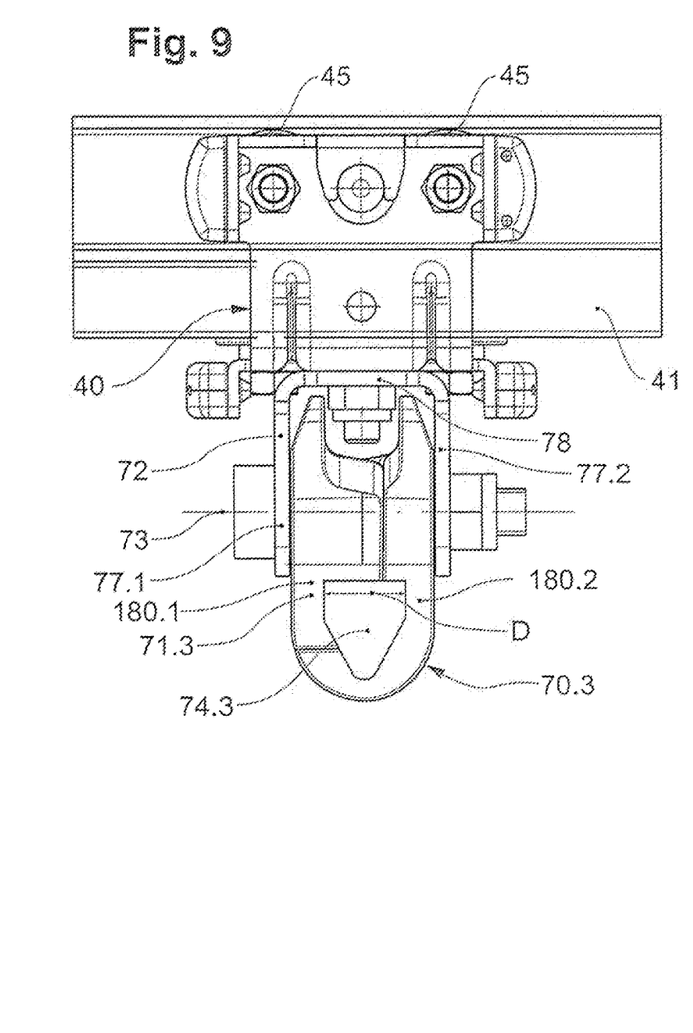
FIG. 9: a lateral view of a third embodiment variant of a connection structure according to the invention and with runner vehicles, according to the second invention aspect.

FIG. 9 shows a third embodiment variant of a connection structure 170 according to the second invention aspect. The third embodiment variant basically corresponds to the second embodiment variant and differs from this merely in the design of the bow receiver 74.3 for the holding bow 26. Accordingly, the third embodiment variant, with the exception of the design of the bow receiver, includes all features of the second embodiment variant, even if these are not all represented in the single FIG. 9.

Figure 4:
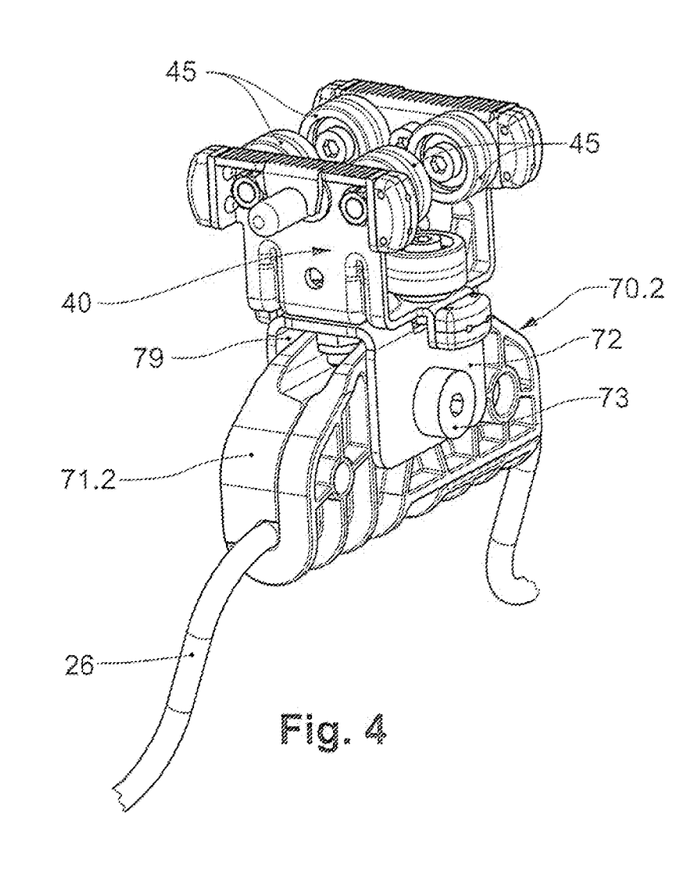
FIG. 4: a perspective view of a second embodiment variant of a connection structure according to the invention and with runner vehicles, according to the second invention aspect.

According to the three embodiment variants, the connection structure 70.1, 70.2, 70.3 includes a pivoting body 71.1, 71.2, 71.3 that is connected to a connection body 72 via a pivot 73.

The pivoting body 71.1, 71.2, 71.3 is an injection moulded part of plastic or metal, which includes reinforcement ribs for increasing the strength.

The pivoting body 71.1, 71.2, 71.3 includes so-called pivoting limitation surfaces 76 in a pivoting body section that is directed to the connection body 72, the pivoting limitation surfaces abutting on a pivoting stop 75 on the connection body 72 on reaching a maximally allowable deflection.

The connection body 72 is designed in a U-shaped manner and includes two lateral guide walls 77.1, 77.2 that are connected to one another via a connection wall 78 and form a pivoting space 79.

A pivoting body section of the pivoting body 71.1, 71.2, 71.3 is arranged in the pivoting space 79 of the connection body 72 and is flanked by the two guide walls 77.1, 77.2.

The guide walls 71.1, 77.2 form a guide for the pivoting body 71.1, 71.2, 71.3. The connection wall 78 forms the pivoting stop 75 for the pivoting limitation surfaces 76.

A pivot 73, which is orientated parallel to the conveying direction F, is led through the two guide walls 77.1, 77.2 and the pivoting body section, which is arranged between these. The pivot 73 connects the pivoting body 71.1, 71.2, 71.3 to the connection body 72. Furthermore, the pivot 73 forms a pivoting mounting for the pivoting body 71.1, 71.2, 71.3 on the connection body 72.

The pivot 73 includes a screw thread that permits the fastening of the pivot 73 on the connection body 72 by way of a screw nut 82.

The connection body 72 is connected to a runner vehicle 40 via the connection wall 78. The connection is a releasable screw connection with screw nuts 83.

The pivoting body 71.1, 71.2, 71.3 forms a bow receiver 74.1, 74.2, 74.3 for receiving a holding bow 26 or a holding bow section. The length L of the bow receiver 74.1, 74.2, 74.3, the bow receiver extending transversely to the conveying direction F in the operational position, is a multiple of the largest diameter D of the bow receiver 74.1, 74.2, 74.3, which is measured parallel to the conveying direction.

According to a first embodiment variant according to FIG. 3 as well as FIGS. 5a and 5b, the pivoting body 71.1 is designed in a single-part manner and includes a slot-like bow receiver 74.1 for the holding bow 26, the bow receiver being open to the connection body 72 and running transversely to the conveying direction F.

A holding bow section is inserted into the slot-like bow receiver 74.1, which is open at one side, before the assembly of the pivoting body 71.1 on the connection body 72, for fastening the holding bow 26 to the pivoting body 72.

The holding bow 26 and with this the transport pocket 21 is pivotably mounted in the bow receiver 74.1 of the pivoting body 71.1 relative to the pivoting body 71.1 in and counter to the conveying direction F.

The bow receiver 74.1 includes a trough-like receiving base, which is designed in an equal but opposite manner to the rest cross section of the in particular circularly-cross-section-shaped holding bow 26. This geometry ensures an extensive contact of the holding bow 26 in the bow receiver 74.1.

The holding bow 26 is furthermore mounted transversely to the conveying direction F in a rigid or non-movable manner, so that a pivoting in the bow receiver 74.1 transverse to the conveying direction F is not possible.

Amongst other things, roll pins 81, which are let into the pivoting body 7.1 and are led transversely through the slot-like bow receiver 74.1, ensure the rigid mounting of the holding bow 26 transverse to the conveying direction F. The roll pins 81 consist of spring steel and are clamped on the pivoting body 71.1 in through-openings.

The roll pins 81 prevent a displacement of the holding bow 26 in the direction of the connection body 72.

According to the second and third embodiment according to FIGS. 4, 6a, 6b, 8 and 9 the pivoting body 71.2, 71.3 is designed in a two-part manner and includes a first, shell-like joining element 80.1, 180.1 as well as a second shell-like joining element 80.2, 180.2.

The joining elements 80.1, 80.2; 180.1, 180.2 are designed in a constructionally identical manner with regard to their geometry and are designed such that these can be joined into a pivoting body 71.2, 71.3 amid the formation of a bow receiver 74.2, 74.3 for the holding bow 26, the bow receiver running transversely to the conveying direction F.

For fastening the holding bow 26 to the pivoting body 72, a holding bow section is inserted between the two joining elements 80.1, 80.2; 180.1, 180.2 in the region of the bow receiver that is to be formed, before the assembly of the pivoting body 71.2, 71.3, i.e., before joining together the joining elements 80.1, 80.2; 180.1, 180.2.

The holding bow 26 and with this the transport pocket 21 is pivotably mounted in the bow receiver 74.2, 74.3 of the pivoting body 71.2, 71.3 in and counter to the conveying direction F.

According to the second embodiment variant according to the FIGS. 4, 6a, 6b and 8, the holding bow 26 is mounted transversely to the conveying direction F in a rigid or unmovable manner, so that a pivoting in the bow receiver 74.1 transverse to the conveying direction F is not possible.

Amongst other things, this is achieved by way of the holding bow 26 in the bow receiver 74.2 being encompassed by the pivoting body over the complete periphery, in particular in an essentially positive manner, at the lateral end sections of the pivoting body 71.2. Hereby, the holding bow is held in the bow receiver 74.2 only with a slight play, and this permits an uninhibited pivoting movement of the pocket in and counter to the conveying direction.

The joining elements 80.1, 80.2 according to the second embodiment variant further include connection openings and diametrically opposed connection pins that, on joining together the joining elements 80.1, 80.2, positively grip into the connection openings and therefore connect the two joining elements 80.1, 80.2 to one another into the pivoting body 71.2. The connection pins moreover likewise ensure a restriction of the movement of the holding bow 26 in the direction of the connection body 72.

According to the third embodiment variant according to FIG. 9, the pivoting body 71.3 in the lateral end sections each includes a bow receiver 74.1 whose cross-sectional area is a multiple of the cross-sectional area of the bow that is to be received. The bow receiver 74.3 forms a V-shaped receiving section whose inclined side flanks in the operational position run together downwards, i.e., in the gravitational direction. The bow receiver 74.3 furthermore above the V-shaped receiving section forms a further rectangular receiving section that together with the V-shaped receiving section forms the bow receiver 74.3.

The V-shaped receiving section in the region of the coinciding lateral flanks forms a defined conveying rest for the holding bow.

The joining elements 180.1, 180.2 according to the third embodiment can likewise include an arrangement of connection openings and diametrically opposed connection pins for joining together the joining elements 180.1, 180.2 in the manner that is described above.

Figure 7A:
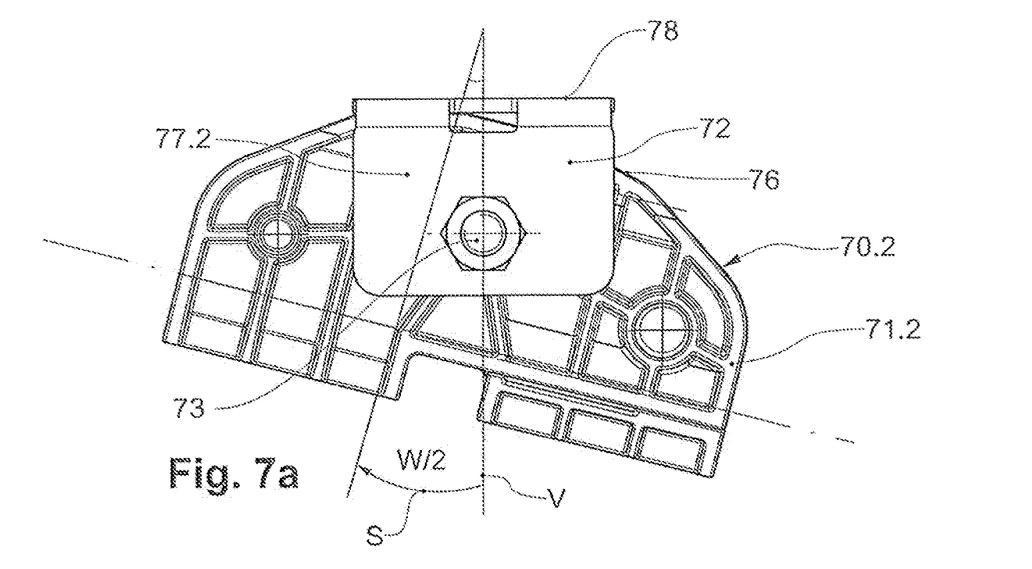
FIG. 7*a*: a view of the connection structure according to FIG. 3 or 4 in the conveying direction with a pivoting body which is pivoted to the left in the conveying direction relative to the connection body.
Figure 7B:
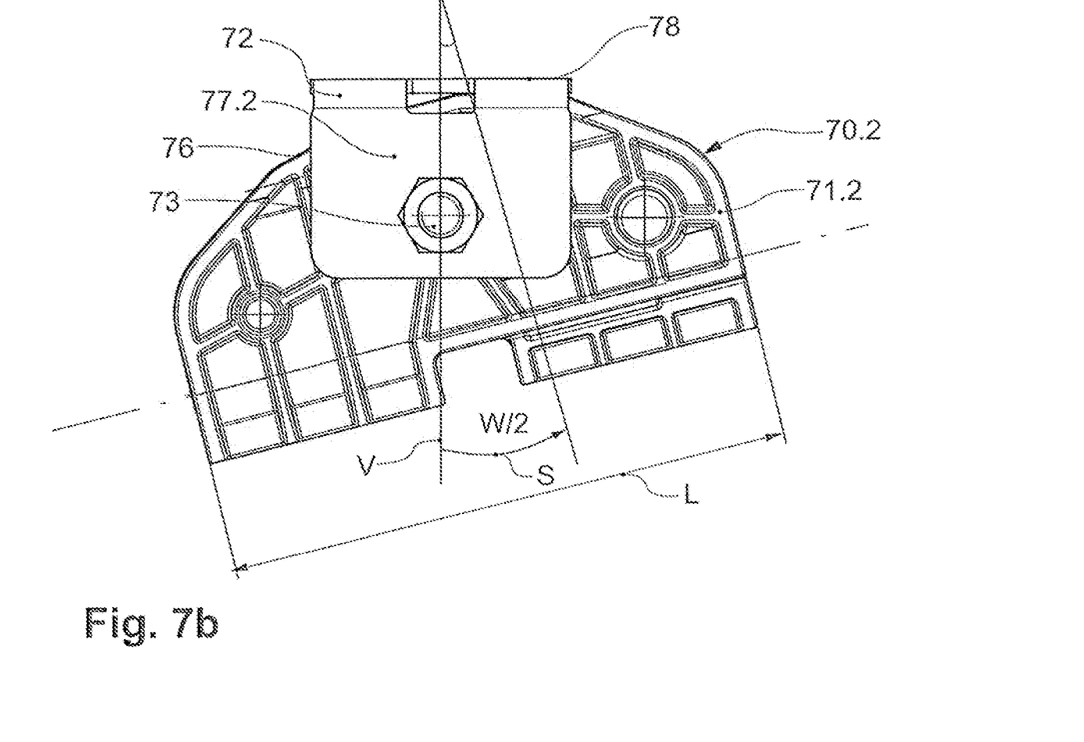
FIG. 7*b*: a view of the connection structure according to FIG. 3 or 4 in the conveying direction with a pivoting body which is pivoted to the right in the conveying direction relative to the connection body.
Figure 8:
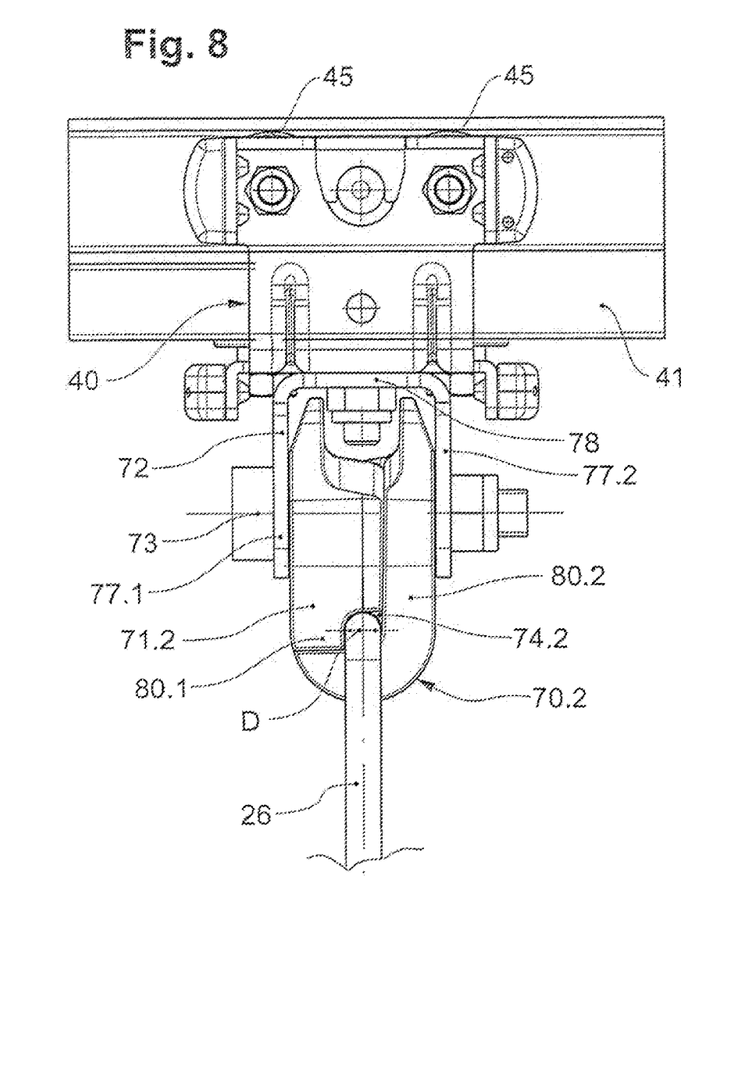
FIG. 8: a lateral view of the second embodiment according to FIG. 4.

The FIGS. 7a and 7b show the maximum lateral deflection of the pivoting body 71.2 with respect to the connection body 72, the maximum lateral deflection being defined by the pivoting stop 75 of the connection body 72 and of the pivoting limitation surfaces 76 of the pivoting body 71.2.

The pivoting body 71.2 is each laterally deflectable out of a vertical V by half the maximal pivoting angle W/2 in a pivoting direction S, which is orientated transversely to the conveying direction F. In the maximal lateral deflection, the pivoting body 71.2 with a pivoting limitation surface 76 hits the pivoting stop 75 on the connection body 72.

Of course, the representation according to FIGS. 7a and 7b also applies to the first embodiment variant according to FIG. 3.

The invention claimed is:

1. An appliance for loading a suspended transport pocket from above with a transport item, comprising a feed device for feeding the transport item into a transfer region and comprising a suspended conveying device with a guide rail and with transport pockets that are movable along the guide rail, wherein:
    a course of the guide rail is designed such that the transport pocket, directly subsequent to a transfer of the transport item, is conveyed away upwards out of the transfer region and therefore out of a conveying level of the feed device in a suspended manner, and conveying paths of the suspended conveying device and of the feed device run on different levels, and
    the guide rail forms a bending section in the transfer region in which the transport pockets are deflected from a feed direction into a conveying-away direction, such that the transport pocket is moved out of the transfer region in the conveying-away direction that is essentially counter to a transfer direction of the transport item over a conveying stretch section.

2. The appliance according to claim 1, wherein the appliance comprises an opening mechanism, by way of which the transport pocket can be opened ahead of or in the transfer region.

3. The appliance according to claim 1, wherein the guide rail runs towards the transfer region in an inclined manner, so that the transport pocket is movable into the transfer region in a gravity-assisted manner and without a drive.

4. The appliance according to claim 1, wherein the transport pocket is actively conveyed into and/or in the transfer region by way of a pusher conveyor.

5. The appliance according to claim 1, wherein the feed device forms a conveying surface on which the transport item lies.

6. The appliance according to claim 1, wherein the feed device comprises at least one conveying unit that forms a conveying surface, and the at least one conveying unit comprises a driveable circulating conveying element.

7. The appliance according to claim 1, wherein the feed device comprises a conveying section that is movable away out of a conveying position for the release of the conveying path of the transport pocket, which is to be conveyed away out of the transfer region.

8. The appliance according to claim 1, wherein the transport pocket forms a receiving compartment that leads the transport pocket in the conveying direction, and the transport pocket is arranged in the transfer region such that the receiving compartment is in front of the feed device.

9. The appliance according to claim 1, wherein the appliance forms a pocket rest, on which, in the transfer region, the transport pocket bears with a pocket front wall.

10. A method for loading at least one transport pocket with a transport item by way of an appliance according to claim 1, the method comprising:
- conveying the transport pocket into the transfer region in a conveying direction,
- feeding the transport item to the transfer region by way of the feed device,
- transferring the transport item from above into the transport pocket, and
- conveying the transport pocket upwards in a suspended manner directly subsequent to the transferring the transport item into the transport pocket, such that the transport pocket is conveyed away out of the conveying level of the feed device,
- wherein the conveying paths of the suspended conveying device and of the feed device run on different levels,
- wherein the transport pocket is moved out of the transfer region in the conveying-away direction that is essentially counter to the transfer direction of the transport item over the conveying stretch section.

11. The method according to claim 10, wherein the transport pocket is opened upstream of or in the transfer region.

12. The method according to claim 10, wherein the transport pocket is moved through the transfer region with a receiving opening which in the conveying direction runs ahead with respect to the pocket rear wall.

13. The method according to claim 10, wherein the transport item is transferred into the transport pocket in a manner assisted by gravity.

14. The method according to claim 10, wherein a conveying section of the feed device is moved away out of a transfer position for the release of the conveying path of the transport pocket, which is to be conveyed away out of the transfer region.

* * * * *